United States Patent [19]

Chu

[11] Patent Number: 5,761,034
[45] Date of Patent: Jun. 2, 1998

[54] PORTABLE MAIN FRAME FOR A COMPUTER HAVING UPPER AND LOWER COVERS PROVIDED WITH COMPUTER COMPONENTS AND PIVOTALLY CONNECTED TOGETHER

[76] Inventor: Shi Chu, 4th Fl., No. 9, Lane 267, Ming Te Rd., Taipei, Taiwan

[21] Appl. No.: 805,371

[22] Filed: Feb. 24, 1997

[30] Foreign Application Priority Data

Jan. 6, 1997 [TW] Taiwan ................................ 86200/24

[51] Int. Cl.$^6$ .............................. G06F 1/20; G06F 1/16; H05K 5/02
[52] U.S. Cl. .................................... 361/687; 361/683
[58] Field of Search ...................... 312/223.2; 364/708.1; 361/683, 685–687

[56] References Cited

U.S. PATENT DOCUMENTS

| | | | |
|---|---|---|---|
| 4,084,213 | 4/1978 | Kirchner et al. | 361/687 X |
| 4,736,332 | 4/1988 | Crease | 364/708.1 |
| 5,051,868 | 9/1991 | Leverault et al. | 361/683 |
| 5,305,183 | 4/1994 | Taynor | 361/686 |
| 5,495,389 | 2/1996 | Dewitt et al. | 361/683 |
| 5,561,893 | 10/1996 | Lee | 361/683 X |
| 5,701,231 | 12/1997 | Do et al. | 361/683 |

*Primary Examiner*—Michael W. Phillips
*Attorney, Agent, or Firm*—Miller, Sisson, Chapman & Nash, P.C.

[57] ABSTRACT

A portable main frame for a computer is composed of an upper cover, a lower cover pivotally connected with the upper cover, a plurality of electrical appliances provided respectively within the upper cover and the lower cover and a handle securely provided to a side face of the lower cover, such that a user is able to carry the main frame by means of the handle. The upper cover is provided with a mother board, a speaker, a ventilation fan, a plurality of function knobs on an outer face thereof, and a pair of hooks. The lower cover is provided with at least two floppy disk drives, a pair of buckling elements, a plurality of sockets on an outer face thereof, and a power switch. The buckling elements engage the hooks to secure the covers together in a closed condition. A handle is provided between the buckling elements.

4 Claims, 3 Drawing Sheets

PORTABLE MAIN FRAME FOR A COMPUTER HAVING UPPER AND LOWER COVERS PROVIDED WITH COMPUTER COMPONENTS AND PIVOTALLY CONNECTED TOGETHER

FIELD OF THE INVENTION

The present invention generally relates to a portable main frame, and more particularly to a portable main frame of a personal computer, which provides easy portability and installation to a user.

BACKGROUND OF THE INVENTION

A Desk-Top personal computer comprises a monitor, a key board and a main frame detachably connected therebetween. Nowadays, computers deeply affect our every step and every one knows the benefits of having a computer and how much a computer can bring to change our life. However, although the desk-top computers, when compared to smaller-sized computers, have better working efficiency and larger memory bank, they still have a drawback, which is that the transportation of this type of computer is not convenient due to their size and weight. For improving the shortcoming of the desk-top computers, a portable notebook type computer is introduced to the market. This type of computer which is light in weight and small in size really overcomes the drawback of the desk-top computer with large size and weight. Therefore, once the note-book type computer was introduced into the market, it quickly attracted everybody's attention and became very popular around the world. But when taking the working efficiency and memory ability of this notebook type computer into consideration, it really can not compete with the desk-top computer.

Still, to those manufacturers having a production line of desk top computers, having another production line manufacturing the note-book type computers in order to meet the satisfaction of most users will increase costs and time in manufacturing.

From the previous description, it is noted that neither a desk-top computer nor a note-book type computer is able to fulfill the practical requirements of most modern users. Thus, a desk-top computer having a portable main frame constructed in accordance with the present invention tends to mitigate and/or obviate the aforementioned problems.

SUMMARY OF THE INVENTION

The main objective of the invention is to provide a portable main frame for a desk-top computer. It is noted that, in one aspect of the invention, the portable main frame constructed in accordance with the present invention is provided with an outer case having an upper cover which has two tracks respectively and opposingly mounted to an inner side face thereof and a lower cover having two arms each respectively and opposingly mounted to an inner side face thereof, a handle provided to an outer face of the lower cover and two buckling elements respectively disposed on both sides of the handle, such that the upper cover is able to be securely connected with the lower cover.

In another aspect of the invention, the present invention further includes a mother board fixedly mounted to an inner side face of the upper cover, a speaker securely mounted beside the mother board, a ventilating fan securely mounted onto a side face of the upper cover and a plurality of function knobs provided onto an outer face of the upper cover; the lower cover is provided to have at least one floppy disk drive having an entrance directed toward outside of the case, and a plurality of sockets disposed on one side thereof. With such a configuration, a user is able to carry the main frame easily and still have the benefit of high speed working efficiency and large memory bank available, comparing to the note-book type computers.

Another objective of the invention is to provide a portable main frame, which is comparatively cheaper and a lot easier to work with than the prior desk-top computers.

Other objects, advantages and novel features of the invention will become more apparent from the following detailed description when taken in conjunction with the accompanying drawings.

BRIEF DESCRIPTION OF THE DRAWINGS

The present invention will now be better understood with reference to the following drawings, wherein.

DETAILED DESCRIPTION OF THE PREFERRED EMBODIMENT

Figure 1:
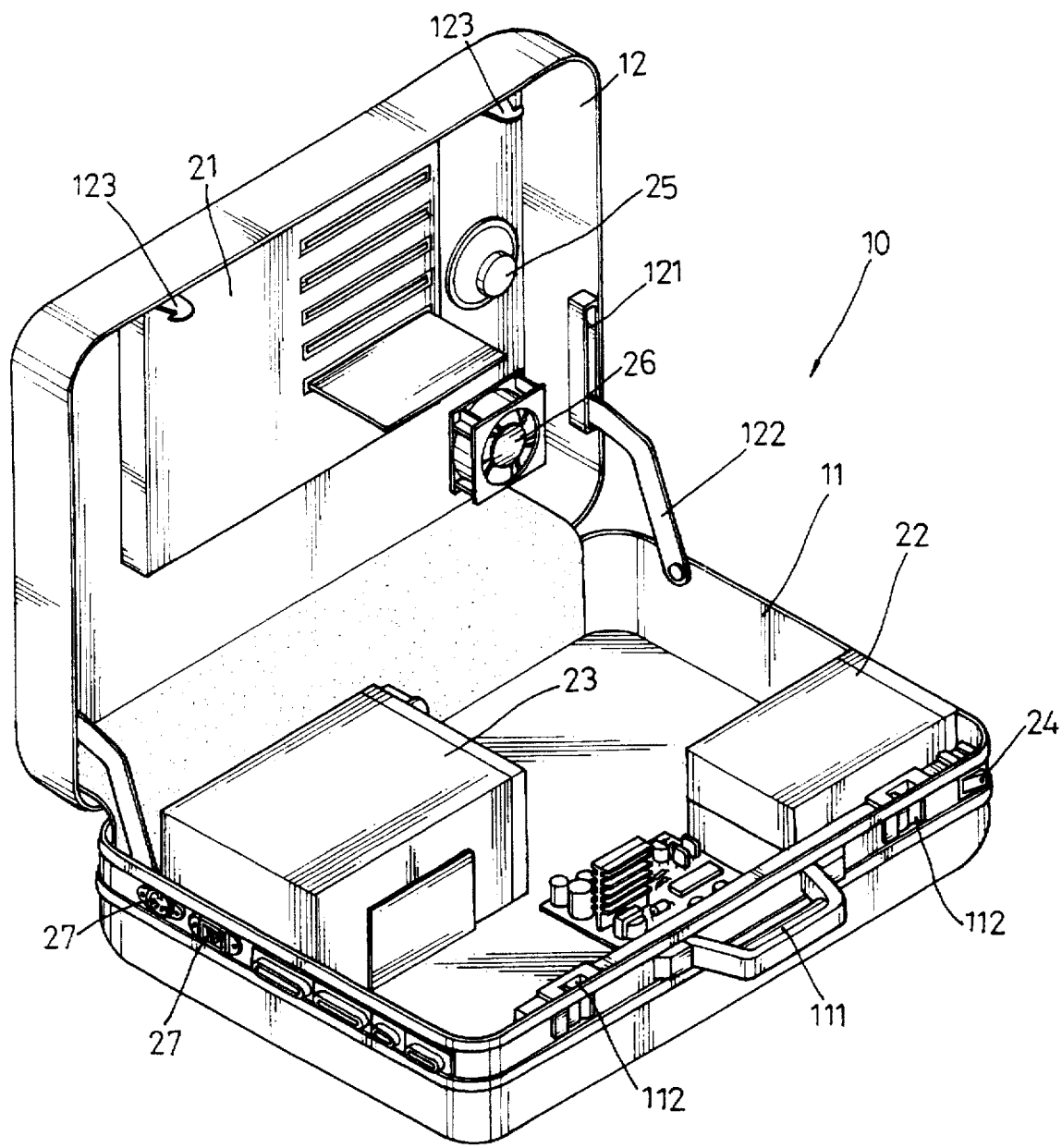
FIG. 1 is a perspective view of a portable main frame constructed in accordance with the present invention.
Figure 2:
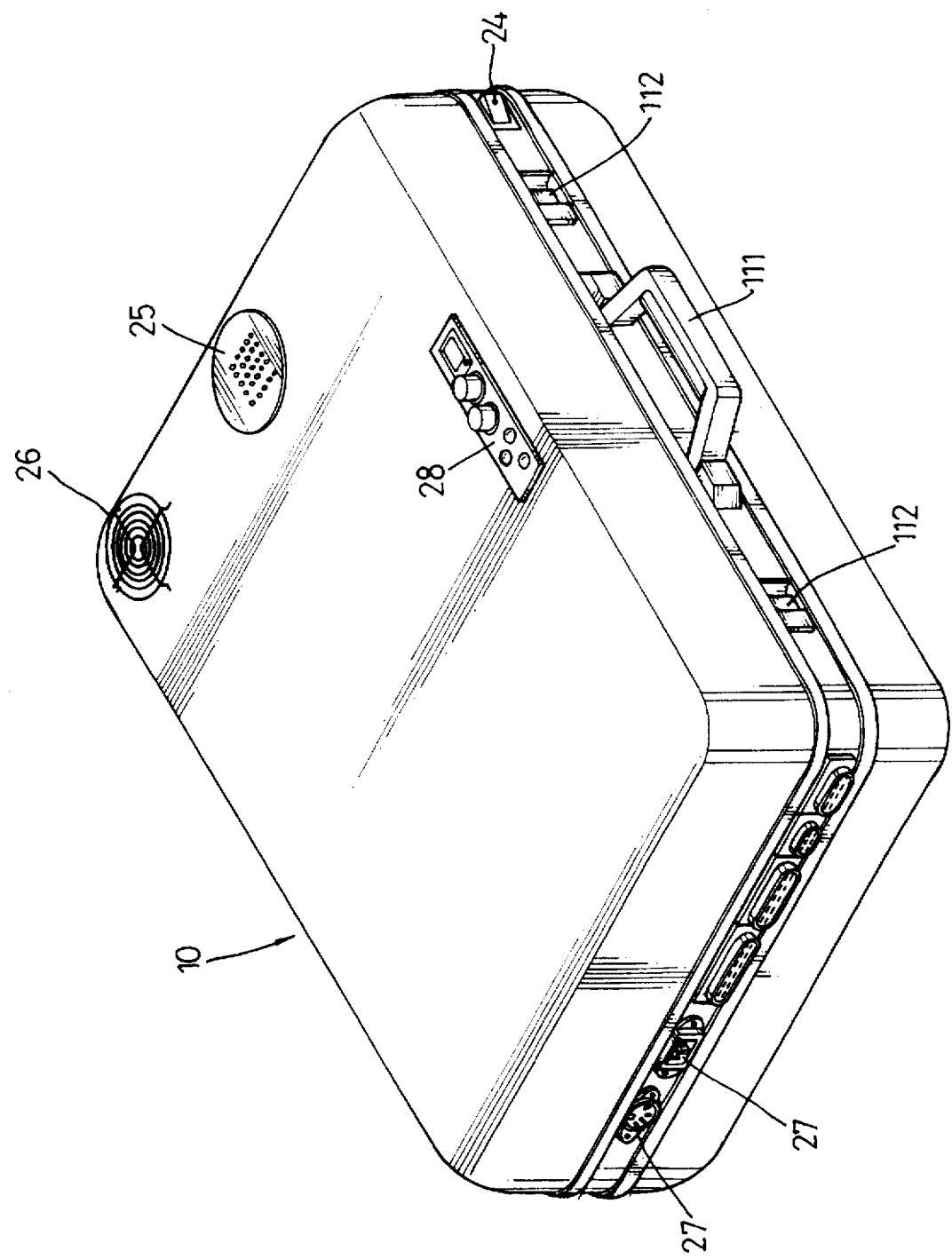
FIG. 2 is one preferred embodiment of the invention.

Referring to FIG. 1, a portable main frame for a computer and constructed in accordance with the present invention is shown. The portable main frame is provided to have an outer case 10 having an upper cover 12 which has two tracks 121 respectively and opposingly mounted to an inner side face thereof and a lower cover 11 having two arms 122 each respectively and pivotally mounted to an inner side face thereof, a handle 111 provided to an outer face of the lower cover 11, two buckling elements 112 each respectively disposed on both sides of the handle 111 and two hooks 123 each respectively mounted onto an upper face of the upper cover 12 and corresponding to the respective one of the buckling elements 112. The portable main frame of the present invention further includes a mother board 21 fixedly mounted to an inner side face of the upper cover 12, a speaker 25 securely mounted beside the mother board 21, a ventilating fan 26 securely mounted onto the inner side face of the upper cover 12 and a plurality of function knobs 28 provided onto an outer face of the upper cover (as shown in FIG. 2). The lower cover 11 is provided to have at least two floppy disk drives 22, 23, and a plurality of sockets 27 disposed on one side thereof. A power switch 24 is provided beside one of the buckling elements 112 to turn on/off a supply of power. All the electrical elements within the upper cover or within the lower cover are electrically connected with each other in a conventional way, thus detailed description of the electrical connection between each other is not necessary.

Referring to FIG. 2, it is to be noted that when the upper cover 12 is closed to the lower cover 11 by means of the hooks 123 and the buckling elements 112, all the electrical element as previously described will be enclosed within the case 10 and a user is able to use the portable main frame of the invention to hook up with other appliances, such as a key board, a monitor or a printer (not shown) through the sockets 27 and once the main frame is required elsewhere, the user is able to carry it by the handle 111 easily.

Figure 3:
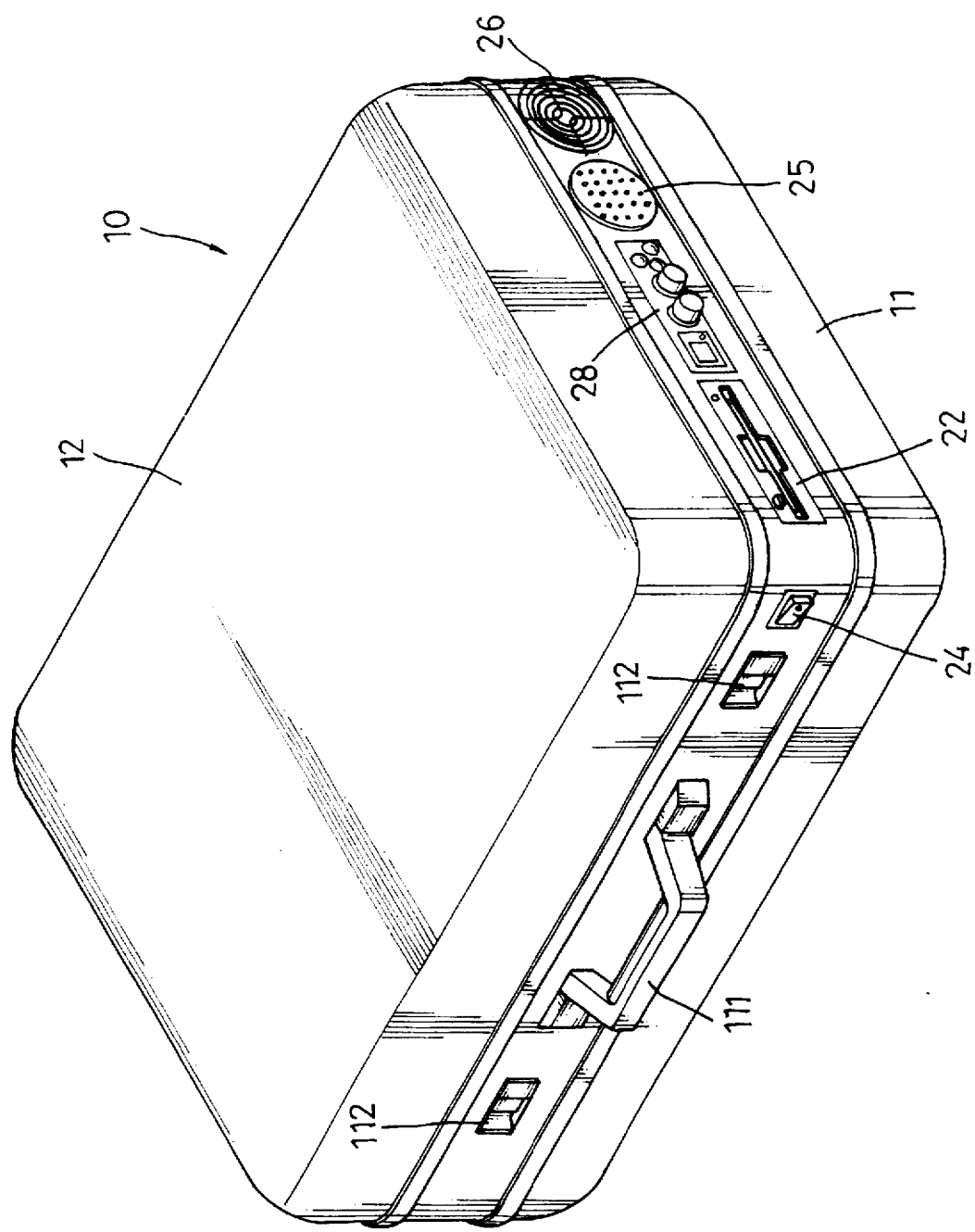
FIG. 3 is another preferred embodiment of the invention.

For different reasons and purposes, the disposition of all the described elements may have different locations (as seen in FIG. 3), so that a user is able to accommodate to various situations.

It is to be noted that, the portable main frame of the present invention not only is portable, but also has high working efficiency, which is not achievable by the note-book type computers. Still, a manufacturer will not have to open another production line to produce computers having different sizes, therefore, cost will be dramatically reduced.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A portable main frame for a computer comprising:

an upper cover provided with a mother board securely mounted thereto, a speaker fixedly mounted beside said mother board, a ventilation fan securely disposed therein, a plurality of function knobs provided on a top face thereof, and a pair of hooks each provided to a side face thereof;

a lower cover movably connected with said upper cover and provided with at least two floppy disk drives securely disposed therein, a pair of buckling elements each respectively mounted in correspondence to each of said hooks, a plurality of sockets provided to an outer face thereof and a power switch mounted beside one of said buckling member; and a handle securely provided between said buckling elements.

2. The portable main frame for a computer as claimed in claim 1, wherein said case further comprises a pair of arms each respectively and pivotally connected to an opposing side face of said lower cover and a pair of tracks mounted within said upper cover for respectively and slidably receiving one of said arm therein.

3. A portable main frame for a computer comprising:

a case having:

an upper cover provided with a mother board securely mounted thereto, a speaker fixedly mounted beside said mother board, a ventilation fan securely disposed therein, a plurality of function knobs provided on a top face thereof, and a pair of hooks each provided to a side face thereof;

a lower cover movably connected with said upper cover and provided with at least two floppy disk drives securely disposed therein, a pair of buckling elements each respectively mounted in correspondence to each of said hooks, a plurality of sockets provided to an outer face thereof and a power switch mounted beside one of said buckling member, a handle securely provided between said buckling elements; and at least one of said floppy disk drives being accessible from the outside of the case.

4. The portable main frame for a computer as claimed in claim 3, wherein said case further comprises a pair of arms each respectively and pivotally connected to an opposing side face of said lower cover and a pair of tracks mounted within said upper cover for respectively and slidably receiving one of said arm therein.

* * * * *